(12) United States Patent
Radivojevic et al.

(10) Patent No.: US 8,334,837 B2
(45) Date of Patent: Dec. 18, 2012

(54) METHOD FOR DISPLAYING APPROACHED INTERACTION AREAS

(75) Inventors: Zoran Radivojevic, Helsinki (FI); Reijo Lehtiniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 10/985,725

(22) Filed: Nov. 10, 2004

(65) Prior Publication Data

US 2006/0114233 A1 Jun. 1, 2006

(51) Int. Cl.
*G09G 5/00* (2006.01)

(52) U.S. Cl. ........ 345/156; 345/157; 345/158; 345/159; 345/160; 345/168; 715/700; 715/705; 715/737; 715/788; 715/828

(58) Field of Classification Search .......... 345/154–170; 715/700
See application file for complete search history.

(56) References Cited

U.S. PATENT DOCUMENTS

| | | | |
|---|---|---|---|
| 5,615,384 A * | 3/1997 | Allard et al. .......... | 715/800 |
| 5,635,958 A * | 6/1997 | Murai et al. .......... | 345/168 |
| 5,736,976 A * | 4/1998 | Cheung .......... | 345/168 |
| 6,014,616 A * | 1/2000 | Kim .......... | 704/8 |
| 6,501,464 B1 * | 12/2002 | Cobbley et al. .......... | 345/173 |
| 6,512,838 B1 * | 1/2003 | Rafii et al. .......... | 382/106 |
| 6,611,253 B1 * | 8/2003 | Cohen .......... | 345/168 |
| 6,798,401 B2 * | 9/2004 | DuFaux .......... | 345/168 |
| 7,194,699 B2 * | 3/2007 | Thomson et al. .......... | 715/823 |
| 2002/0085038 A1 * | 7/2002 | Cobbley et al. .......... | 345/773 |
| 2002/0118175 A1 * | 8/2002 | Liebenow et al. .......... | 345/168 |
| 2006/0084482 A1 * | 4/2006 | Saila .......... | 455/575.1 |

OTHER PUBLICATIONS

U.S. Appl. No. 10/967,096, filed Oct. 15, 2004, S. Seila.
Web pages, http://www.canesta.com/chipset.htm, home page.

* cited by examiner

*Primary Examiner* — Grant Sitta
(74) *Attorney, Agent, or Firm* — Alston & Bird LLP

(57) ABSTRACT

A method, a computer program and a computer program product for interacting with a device via an interaction unit, wherein the interaction unit comprises a plurality of interaction areas that can be activated by an activation unit to effect the interaction, the method comprising detecting approached interaction areas, wherein the approached interaction areas are interaction areas that are approached by the activation unit without yet being activated; displaying representations of the approached interaction areas on a display of the device. The invention further relates to the device itself and to a module for such a device.

21 Claims, 7 Drawing Sheets

METHOD FOR DISPLAYING APPROACHED INTERACTION AREAS

FIELD OF THE INVENTION

This invention relates to a method for interacting with a device via an interaction unit, wherein said interaction unit comprises a plurality of interaction areas that can be activated by an activation unit to effect said interaction. The invention further relates to said device itself and to a module for said device.

BACKGROUND OF THE INVENTION

Human-machine interfaces that enable a user to interact with a device are well-known in the art for a plurality of different types of devices. For each of said devices, specially adapted human-machine interfaces have been developed that account for the ergonomic characteristics of the human user and thus allow for an efficient and comfortable interaction of the user with the device.

In particular in most of the electronic devices that process textual information, as for instance desk-top or lap-top computers, or hand-held multimedia devices such as Personal Digital Assistants (PDAs) or mobile phones, some type of alphanumeric keyboard, comprising a plurality of keys that are labelled with one or more letters, numbers or symbols, are used to allow the user to enter instructions to be executed by said electronic device or to generate textual information, as for instance documents, databases, messages or the like.

When keys of said alphanumeric keyboard are pressed with the fingertips of the user's hands, information associated with said pressed keys, and usually represented on said keys in the form of a key label, is generated in the shape of electric signals that are transferred to the electronic device via a wired or wireless, for instance optical, interface.

In most text processing applications, after a key is pressed by a user, the information associated with said pressed key is instantly displayed on a display of said electronic device, for instance in a window of a computer screen or a hand-held device. As a matter of fact, even when said keyboard is a touch-screen, said keyboard and said display or display area that show the entered information are spatially separated. For instance, in case of a touch screen keyboard, where the keyboard is integrated into a display, a first area of said display, for instance the lower part of the display, will be dedicated to said keyboard, wherein a second area, for instance the upper part of said display, will be consumed by said window that depicts the entered information.

In state-of-the-art desk-top or lap-top computer applications, the keyboard is generally positioned substantially plane on a table, and the area of the display is positioned substantially perpendicular to the area of the table.

Thus when entering text, which is to be displayed on a display of an electronic device, via a keyboard, a frequent change of the look direction or even the entire head orientation is required to control (with look direction to the keyboard) if the fingertips are positioned on the correct keys of the keyboard, so that the desired keys are pressed, and to control (with look direction to the display) if the text entered via the keyboard is actually correct. The frequency of said change in the look direction generally decreases with increasing skills of the typist, in the extreme case of a very skilled typist requiring basically no checking back on the fingertip positions on the keyboard at all; but generally most of the mediocre typists have to check back the fingertip positions on the keyboard when more rare keys such as symbol keys or certain control keys have to be pressed.

Frequently changing the look direction does not only increase the typing time and sensitivity to typing errors, but also often requires additional re-focusing of the eye due to different distances of the eye from the keyboard and display, respectively. Consequently, a high frequency of change in the look direction also causes eyestrain.

These problems are even more pronounced in the context of hand-held multimedia devices. A first group of such hand-held devices is equipped with keypads (small keyboards) that consist of extremely small keys, the position of which is generally not standardized. The aggravation of the above-stated problems with such keypads is obvious. A second group of such hand-held devices comes with foldable keyboards, with problems comparable to the context of desktop and laptop computers, or uses alternative solutions such as for instance optically projected virtual keyboards. Such virtual keyboards basically comprise the following components: a first component projects an image of the keys of a keyboard onto a plane area, e.g. a table surface, a second component generates a beam of infra-red light that is reflected by the fingers of the user resting on the projected keyboard, and a third component receives the reflections of said beam of infra-red light from the fingers of said user to determine which virtual keys are pressed by the user. In addition to the problems emphasized above in the context of desktop and laptop computer keyboards, in this type of keyboard the fingers themselves may disturb the projection of the keyboard image onto the plane surface, so that even when looking towards the keyboard, it may be difficult for the user to decide on which keys his finger tips are actually resting.

SUMMARY OF THE INVENTION

In view of the above-mentioned problem, it is, inter alia, an object of the present invention to provide a method, a computer program, a computer program product, a device and a module that enable a more efficient and less fatiguing interaction with a device via an interaction unit.

It is proposed a method for interacting with a device via an interaction unit, wherein said interaction unit comprises a plurality of interaction areas that can be activated by an activation unit to effect said interaction, said method comprising detecting approached interaction areas, wherein said approached interaction areas are interaction areas that are approached by said activation unit without yet being activated; and displaying representations of said approached interaction areas on a display of said device.

Said device may be any device that provides a human-machine interface for interacting with said device, for instance a desktop or laptop computer or a multimedia device like a television set, a PDA or a mobile phone.

For the purpose of interaction, said device provides an interaction unit that comprises a plurality of interaction areas that can be activated by an activation unit. Interaction then is reflected by the fact that the user can select and activate different interaction areas of said interaction unit to cause effects with said device. Said interaction unit may for instance be a keyboard, and said interaction areas are keys of said keyboard. Therein, said keyboard may be an alphanumeric keyboard, or also a piano keyboard or a keyboard with navigation buttons of a game console. Said keyboard also may be a touch-screen or a virtual keyboard that is optically projected on a surface.

Said interaction unit and said display may be positioned on substantially the same side of said device, i.e. not on substantially opposite sides of said device. Therein, the arrangement of a keyboard of a desktop or laptop computer and the display of said computer, which may for instance be an arrangement of two planes that are substantially perpendicular to each other, is understood as positioning of the interaction unit (keyboard) and the display on substantially the same side of said device (computer).

However, it may also be advantageous that said interaction unit and said device are located on substantially opposite sides of said device, for instance to allow for a reduction of the size of said device.

Said activation unit may depend on the type of interaction unit used and may frequently be a human hand with a plurality of fingers. Other types of activation units may for instance be a stylus, in particular on small keypads, or an electronic glove, or similar units.

Approached interaction areas are detected first. Therein, said approached interaction areas are interaction areas of said plurality of interaction areas of said interaction unit that are approached by said activation unit without yet being activated. This is however not meant to exclude that said approached interaction units will be activated later, but is rather meant to characterise that said approached interaction areas are detected before or in the process of their activation by said activation unit.

For instance, if said interaction unit is a keyboard and said activation unit is a human hand, said approached interaction areas may be the keys closest to each fingertip, i.e. the keys on which fingertips of said hand are positioned before one of said keys is activated. These keys may for instance be detected by means of surveillance of the keyboard with ultra-sonic or microwave or optical or other types of waves. Contact between fingertips and keys may not be required to detect approached interaction areas. In case of a virtual keyboard that is optically projected onto a surface, said detection of said approached interaction areas may be accomplished by realtime tracking of the movements of the fingers of a user on said projected keyboard.

Representations of said approached interaction areas are displayed on a display of said device. Said display may in most cases be the same display on which the effects of said interaction are visible as well, for instance, if said interaction is the entering of alphanumeric symbols of a text into said device, said text may be visible on said display.

Said approached interaction areas can be displayed on said display in a plurality of different ways. For instance, in case of a keyboard as interaction unit, miniature schematic images of said approached keys of said keyboard may be displayed on said display in a picture-in-picture mode, i.e. overlaying other contents that are displayed on said display, like for instance the contents that are effected by said interaction, e.g. texts or the like.

The detection of the approached interaction keys and the displaying of representations of said approached interaction keys on said display of said device according to the present invention eliminates the need to frequently change the look direction when interacting with said device via said interaction unit. During interaction, the control looks on the interaction unit are no longer required, because the information that can be gathered in said control looks is already visible on said display of said device in the form of said displayed representation of said approached interaction areas.

Thus, by completely eliminating the need for control looks to the interaction unit or by at least reducing the frequency of said control looks the present invention significantly increases the interaction speed, for instance the time it takes to enter a text into said device. Furthermore, the present invention also prevents or at least reduces eyestrain, because frequent re-focusing of the eye is avoided.

According to an embodiment of the method of the present invention, representations of at least a portion of said plurality of interaction areas are displayed on said display in a first representation mode, and said representations of said approached interaction areas are displayed on said display in a second representation mode.

Said displaying of said representations of at least a portion of said plurality of interaction areas may serve both to indicate to a user that interaction is now possible or required, and to provide an overview over at least said portion of said interaction areas on said interaction unit. This displaying is performed in a first representation mode, and the displaying of representations of said approached interaction areas then is performed in a different representation mode so that a user is aware of which of said representations of said interaction areas refer to approached interaction areas and which do not. For instance, a miniature image of all keys of a keyboard may be displayed on said display, and when keys are approached by a user's hand, said keys are displayed on said display in an accentuated fashion, for instance in different colours and/or textures and/or sizes, or with a frame or circle around it, which may for instance be flashing, or with a spot light placed on it, or in other fashion. Enlarging said approached keys may be particularly useful for elder people. The accentuated keys indicate to the user where his fingers are positioned on the keyboard, and as not only representations of the approached keys, but also representations of at least a portion of the rest of the keys of the keyboard are displayed on the display, it is easy for the user to navigate his/her fingers across the keyboard without having to check back his/her finger positions by looking on the keyboard, because the actual positions of his fingertips on the keyboard are accentuated as approached keys on said displayed keyboard.

According to a further embodiment of the method of the present invention, the method further comprises detecting activated interaction areas, wherein said activated interaction areas are interaction areas that have been activated by said activation unit; and displaying representations of said activated interaction areas on said display.

Said detection of said activated interaction areas may be performed by the same instance that detects said approached areas, or by a separate instance. Displaying representations of said activated interaction areas on said display provides feedback to the user, so that he can be assured that his/her activation of an interaction area has been accepted by said interaction unit. Displaying representations of said activated interaction areas may further increase the interaction speed, because then not even a change of the look direction from the area of the display that displays the effect of the user interaction, as for instance a window of a text processing program or e-mail composer, and the area where the representations of the approached interaction areas are displayed, is required, because the confirmation of the activation of interaction areas is already visible in the area where the representations of the approached (and activated) interaction areas are displayed.

According to a further embodiment of the method of the present invention, said representations of said approached interaction areas are displayed in a first representation mode, and said representations of said activated interaction areas are displayed on said display in a second representation mode.

Said representations of said approached interaction areas and said representations of said activated interaction areas may for instance be displayed in different colours, sizes, textures, or may be accentuated in any other different fashions, for instance representations of activated interaction areas may flash at the moment of activation, may be furnished with a spot or flash light circle or frame around it or be animated in any other way. This contributes to a better differentiation between approached and actually activated interaction areas and thus increases the interaction speed.

According to a further embodiment of the method of the present invention, representations of at least a portion of said plurality of interaction areas are displayed on said display in a first representation mode, said representations of said approached interaction areas are displayed on said display in a second representation mode, and said representations of said activated interaction areas are displayed on said display in a third representation mode.

Said three representation modes for representations of said portion of said plurality of interaction areas, of said approached and said activated interaction areas, respectively, contribute to an improved differentiation between said different types of interaction areas and thus increases the interaction speed. For the different representations modes, for instance different colours, sizes, or textures, or different effects such as flashing frames or circles, spot lighting or animation may be used. In a simple example, said interaction unit is a keyboard, and then a small image of said keyboard is displayed on the display with all keys in said image having white key background, currently approached keys of said keyboard are displayed with yellow key background and activated keys are depicted with red key background.

According to a further embodiment of the method of the present invention, said representations of said approached interaction areas displayed on said display preserve information on the positioning of said interaction areas on said interaction unit.

The positioning of said representations of approached interaction areas on said display may for instance be to scale with respect to the positioning of said interaction areas on said interaction unit, but need not be. Preserving information on the positioning of said interaction areas when displaying representations of said interaction areas supports navigating the activation unit across the interaction unit without requiring control looks to the interaction unit in particular if the arrangement of the interaction areas on the interaction unit is unusual and/or non-standardized and has not yet been internalised by the user.

According to a further embodiment of the method of the present invention, said representations of said approached interaction areas displayed on said display cover other content displayed on said display.

This technique is particularly easy to implement, for instance said representations of said approached interaction areas may always be displayed in the same area of said display, for instance in a picture-in-picture area of said display. However, relevant content then may be covered by said displayed representations of said approached interaction areas.

According to a further embodiment of the method of the present invention, said representations of said approached interaction areas displayed on said display semi-transparently overlay other content displayed on said display.

The content displayed on said display then is not completely covered by said displayed representations of said approached interaction areas and may thus be experienced as less disturbing.

According to a further embodiment of the method of the present invention, said representations of said approached interaction areas are displayed on said display in a way that a minimum amount of interference with relevant parts of other content displayed on said display is caused.

Said representations of said approached interaction areas may for instance be displayed in a display area of said display where only non-relevant content will be covered. This display area may for instance be a-priori known or reserved for this purpose, or may be adaptively determined by analysing said content that is displayed on said display, for instance by considering preferences defined by a user, wherein said preferences indicate which type of content is considered relevant by the user and which content is not.

According to a further embodiment of the method of the present invention, said representations of said approached interaction areas are only displayed on said display if an interaction with said device is required.

This causes a reduced amount of disturbance of the content that is displayed on said display, and also alerts the user that interaction is required when said representations of said interaction areas appear on said display. For instance, a miniature image of said keyboard may only be displayed on said display if text input is required, and if the user positions his fingertips on the keyboard, then the approached and possibly activated keys are accentuated in said image of said keyboard.

According to a further embodiment of the method of the present invention, said representations of at least a portion of said plurality of interaction areas are only displayed on said display if at least one of said interaction areas has been approached by said activation unit during a pre-defined period of time.

For instance, if interaction is required, it may be checked for said pre-defined period of time if at least one of said interaction areas is approached by said activation unit, and only then said representations of at least a portion of said plurality of interaction areas are displayed on said display. Also, when said representations of at least a portion of said plurality of interaction areas are displayed, and no interaction area is approached for said pre-defined period of time, said representations are no longer displayed.

According to a further embodiment of the method of the present invention, each of said interaction areas is associated with at least one interaction with said device, and wherein said associations can be re-configured.

For instance, if said interaction unit is a keyboard, said interaction with said device may be the inputting of alphanumeric symbols or commands linked with the respective keys of said keyboard. The association of alphanumeric symbols or commands to the keys can then be re-configured, for instance to better match a user's needs. Because representations of the approached keys are visualized on the display, and may for instance indicate the alphanumeric key associated with the respective approached key, the user may explore the interactions associated with the keys of the keyboard by approaching the keys and inspecting the representations of the approached keys on the display. Furthermore, it may then be not necessary to actually label the keys of the keyboard, in particular if frequent re-configuration of the associations takes place.

According to a further embodiment of the method of the present invention, said interaction unit and said display are not positioned on substantially opposite sides of said device.

The reason for the displaying of approached interaction areas on said display according to this embodiment of the present invention is not the fact that the interaction unit and display are located on opposite sides of said device so that the user cannot see where the activation unit is currently positioned with respect to the interaction areas and has to gather this information from the displaying of the approached interaction areas on the display, but instead, according to this embodiment of the present invention, the displaying of approached interaction areas on the display is intended to reduce the frequency of changes in the look direction of the user (between interaction unit and display) and thus to increase interaction speed, to reduce interaction errors and to reduce eyestrain. The arrangement of display and interaction unit according to this embodiment of the present invention may also be advantageous when a user is still learning to use the interaction areas of said device and then will have to check back the positions of desired interaction areas on said interaction unit.

According to a further embodiment of the method of the present invention, said interaction unit and said display are positioned on substantially opposite sides of said device.

This arrangement may significantly contribute to decreasing the size of said device, as the area that is consumed by a display on one side can be re-used by the interaction unit on the other side of said device. This arrangement may further improve the manageability of said device; for instance, if the interaction unit is located on the backside of the device and the display on the frontside, the device may then be held (with the fingers positioned on the backside and the thumbs on the frontside) and interacted without requiring a change of the positions of the fingers. Displaying approached interaction areas on the display then may be the only way to make the user aware where the activation unit, for instance the users finger tips, are currently positioned with respect to the interaction areas of said interaction unit.

According to a further embodiment of the method of the present invention, said interaction unit is a keyboard, and said interaction areas are keys of said keyboard.

Said keyboard may for instance be an alphanumeric keyboard as for instance a desk- or laptop computer keyboard, or a keypad of a hand-held electronic device such as a mobile phone, a PDA or another device, or a piano-like keyboard of an electronic music instrument. It may equally well be a navigation pad of a game console or the like. Said keyboard may be integrated into said device, or may be an external component.

According to a further embodiment of the method of the present invention, approached keys of said keyboard are detected by means of optic and/or electromagnetic and/or sound waves.

Means for detecting said approached keys then may be located inside or outside said keyboard.

According to a further embodiment of the method of the present invention, said approached keys of said keyboard are detected by means of sensors that are contained in said keyboard, and said sensors are thermal and/or electric and/or optic and/or electromagnetic and/or haptic sensors.

Said optic sensors may for instance be light cells and/or photo-sensitive sensors, and said electric sensors may be implemented by conductive areas on the keys of said keyboard.

According to a further embodiment of the method of the present invention, said interaction unit is an optically projected virtual keyboard.

When said keyboard is optically projected onto a surface, a beam of light is directed to said keyboard, and the reflections of said beam of light caused by the activation unit moving across the keyboard are detected and analysed to determine approached and activated areas in real-time.

According to a further embodiment of the method of the present invention, said interaction unit is an optically projected virtual keyboard, and said steps of detecting approached interaction areas and of detecting activated interaction areas are performed by the same instance of said device.

This may for instance be an instance that detects and analyses reflections of light caused by the activation unit moving across the keyboard to determine approached and activated areas in real-time.

According to a further embodiment of the method of the present invention, said interaction areas of said interaction unit are keys of a keyboard, a schematic image of at least a portion of said keyboard is at least temporarily displayed on said display, and approached keys of said keyboard are accentuated by changing an appearance of said approached keys in said schematic image.

This accentuation allows the user to clearly recognize which of said keys are approached.

According to a further embodiment of the method of the present invention, said appearance of said approached keys in said schematic image is changed by changing a colour and/or size and/or texture of said approached keys or by furnishing said approached keys with a frame or circle or with a spot light.

Said approached keys may also be animated, for example be zoomed in or out, or may be displayed in a 3D-like fashion, for instance visualizing their approaching by said activation unit by slightly shifting them along a line parallel to the diagonal of said display.

According to a further embodiment of the method of the present invention, said device is capable of text processing.

Said interaction unit may for instance be optimised for text input.

According to a further embodiment of the method of the present invention, said device is a portable device.

The present invention may be advantageous in the context of portable devices because the interaction units are then generally unusual and/or non-standardized and small in size, so that detection of approached interaction units and displaying of representations thereof on the display of the device is experienced as a valuable support in text processing applications.

It is further proposed a computer program with instructions operable to cause a processor to perform the above-described method steps.

Said computer program may for instance be executed on the central processing unit of said device, or in a controller of a module that is added to said device, and said computer program may be stored on a computer readable storage medium, for example a memory.

It is further proposed a computer program product comprising a computer program with instructions operable to cause a processor to perform the above-described method steps.

Said computer program product may represent all types of data carriers such as for instance electric, magnetic and optic storage mediums.

It is further proposed a device, comprising an interaction unit, wherein said interaction unit comprises a plurality of interaction areas that can be activated by an activation unit to effect an interaction with said device; means for detecting approached interaction areas, wherein said approached interaction areas are interaction areas that are approached by said activation unit without yet being activated; and means arranged for displaying representations of said approached interaction areas on a display of said device.

Said device may be any device that provides a human-machine interface for interacting with said device, for instance a desktop or laptop computer or a multimedia device like a television set, a PDA or a mobile phone.

Said means arranged for detecting approached interaction areas may for instance be implemented together with a means of said device that detects activated interaction areas.

It is further proposed a module for a device, wherein said device comprises an interaction unit, and wherein said interaction unit comprises a plurality of interaction areas that can be activated by an activation unit to effect an interaction with said device; said module comprising means for detecting approached interaction areas, wherein said approached interaction areas are interaction areas that are approached by said activation without yet being activated; and means arranged for displaying representations of said approached interaction areas on a display of said device.

Said module may for instance be integrated into said device or attached thereto.

These and other aspects of the invention will be apparent from and elucidated with reference to the embodiments described hereinafter.

DETAILED DESCRIPTION OF THE INVENTION

The present invention proposes to detect approached interaction areas of an interaction unit and to display representations of said interaction unit on the display of a device in order to allow for an interaction with said device that does not require frequent changes of the look direction from the display to the interaction unit.

In the following, the present invention will be described in more detail by means of exemplary embodiments, which shall by no means be understood to limit the scope of the present invention. Therein, said interaction unit is assumed to be a keyboard, said interaction areas are keys of said keyboard, and said activation unit are the fingers (or fingertips) of a user that is interacting with a device via said keyboard.

Figure 1:
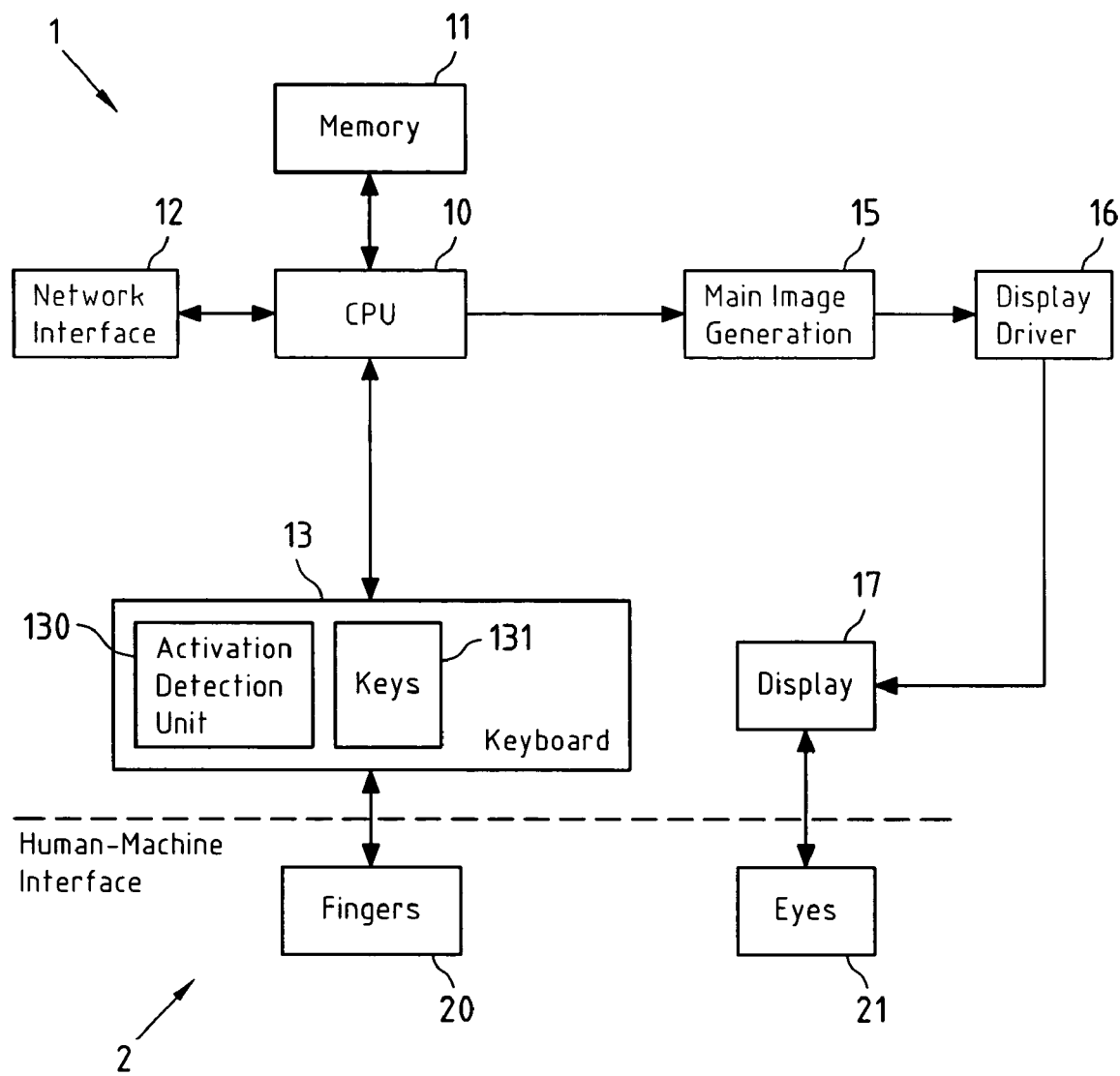
FIG. 1: a schematic presentation of a device with a keyboard as user interaction unit according to the prior art.

FIG. 1 depicts the basic components of a device 1 with an keyboard (interaction unit) 13 according to the prior art. Therein, the human-machine interface between said device 1 and a human user 2 is given as horizontal dashed line, and particularly refers to the interface between the user's fingers (activation unit) 20 and the keyboard 13, which is a haptic interface, and between the user's eyes 21 and the display 17, which is an optic interface. Therein, said keyboard 13 and said display 17 can be positioned on opposite sides of said device, or can be positioned not on opposite sides of said device 1 (i.e. on substantially the same side of said device). Said device 1, which in this exemplary case may be understood to be a mobile phone or PDA with capabilities to support Short Message Services (SMS), Multimedia Messaging Services (MMS) and email, comprises a Central Processing Unit (CPU) 10, that controls the whole functionality of said device 1, a memory 11, where for instance data and program code executed by said CPU 10 are stored, and a network interface 12, for instance an interface to a core network of a mobile radio communications system, with which control and application data is exchanged by said device 1.

Said device 1 further comprises a keyboard 13 with a plurality of keys 131. Said keyboard 13 further comprises an activation detection unit 130, which detects activation of interaction areas of said interaction unit by said activation unit 20, and inputs information on said activated keys to said CPU 10. Therein, said connection between said keyboard 13 and said CPU 10 may comprise a wireless connection, if said keyboard 13 is connected to said device 1 via a wireless connection, for instance based on infrared or electromagnetic signal transmission.

If said keyboard 13 is a keyboard with a plurality of keys that are activated by pressing said keys and thus activating some type of contacts or switches, said activation detection unit is represented by the contacts/switches in each of said keys and the associated control logic of said keyboard. Said keyboard may either be integrated into said device 10, or may be an external keyboard, e.g. a foldable keyboard, that is connected to said device 1 via a dedicated interface.

If said keyboard 13 is an optically projected virtual keyboard, said activation detection unit is that component of said virtual keyboard that receives and analyses reflections of signals caused by the fingers of a user when "typing" on said virtual keyboard. Said components required to implement said virtual keyboard functionality may be integrated in said device 1, or may be external components that are connected to said device 1 via a dedicated interface.

Said CPU 10 of said device 1 processes the information on the activated keys of said keyboard 13 and controls a main image generation instance 15 accordingly. Said main image generation instance 15 generates the main image (content) that is to be displayed on a display 17 of said device, for instance an image of a desktop of an operations system used by said device 1 with an open window on said desktop into which text can be inputted by said user 2. Said window may for instance be a window of a text processing application or of an email or SMS or MMS composer. In accordance with the information on the activated keys, the CPU then may trigger the appearance of alphanumeric symbols in said window, wherein said alphanumeric symbols are associated with said activated keys.

Said main image generated by said main image generation instance 15 then is forwarded to a display driver 16 that controls the display 17 so that said main image is displayed on said display 17 and can be viewed by the eyes 21 of the user 2.

In order to avoid that a frequent change of the look direction from the display 17 to the keyboard 13 is required to control if the activation unit is properly positioned for activation of keys, the prior art device 1 of FIG. 1 can be enhanced with a module 3 according to the present invention. This yields an improved device 1a that is depicted in FIG. 2, wherein like components are denoted with the same numerals as in FIG. 1.

Figure 2:
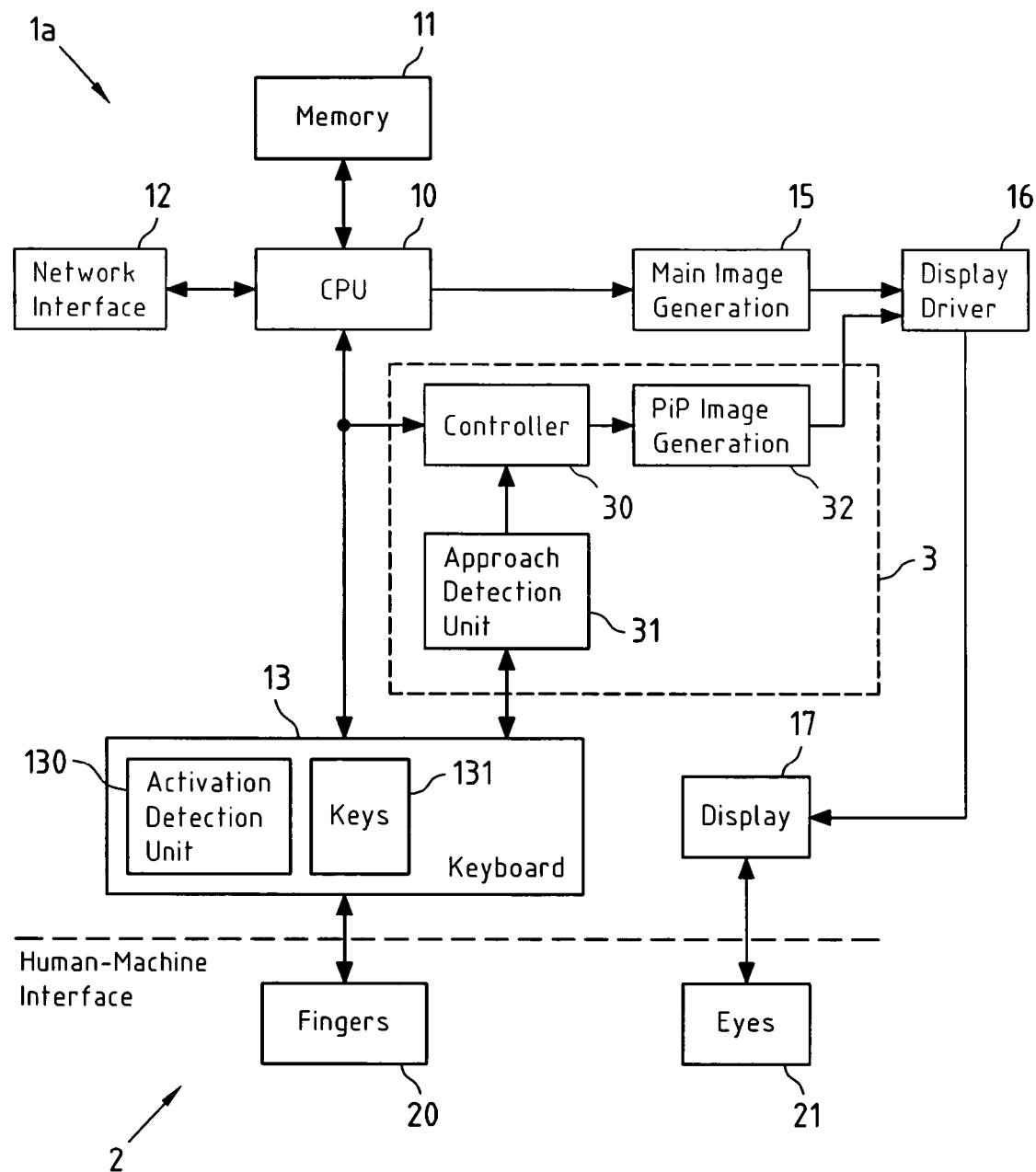
FIG. 2: a schematic presentation of a device with a keyboard as user interaction unit and an additional module for detecting and displaying approached keys of said keyboard according to an embodiment of the present invention.

In FIG. 2, the device 1a according to the present invention additionally comprises the module 3, which in turn comprises an approach detection unit 31, a controller 30 and a Picture-in-Picture (PiP) image generation instance 32. Therein, said module may be integrated into said device 1a or may be attached thereto.

Said approach detection unit 31 detects keys on said keyboard that are approached by said fingers 20 without yet being activated (their activation may nevertheless happen later). Detection of approached keys may take place in a plurality of ways, and depends on the type of keyboard 13 chosen. If said approach detection unit 31 is part of a module 3, as it is the case in this embodiment of the present invention depicted in FIG. 2, said approach detection unit 31 may only be able to perform detection of said approached keys from outside of said keyboard 13. For all types of keyboards and keypads (optically projected or not), detection of approached keys may for instance be accomplished by real-time tracking of the user's fingers 20 moving across the interaction unit 13, for instance by means of surveillance of said keyboard 13 with optic, electromagnetic or sound waves. Nevertheless also other techniques may be applied.

Information on said approached keys is inputted from said approach detection unit 31 into said controller 30, which triggers said PiP image generation instance 32 so that a PiP image that contains representations of said approached interaction areas is generated. In addition to said approached keys, said PiP image may further contain representations of at least a portion of all of said keys 131 of said keyboard 13, and, when said controller 30 has access to the information on the activated keys exchanged between keyboard 13 and the CPU 10, also representations of activated keys. Said PiP image is inputted into the display driver 16 together with the main image signal that stems from the main image generation instance 15, so that both the main image and the PiP image are displayed on said display 17.

When viewing the display 17 with his eyes 21, the user 2 sees the PiP image superposed (in a covering fashion or a semi-transparent fashion) to the main image, and as the PiP image contains representations of the approached keys on said interaction unit 13, frequent toggling of the look direction between keyboard 13 and display 17 can be avoided and an accelerated and less fatiguing input of text into said device 1 is achieved.

Figure 3:
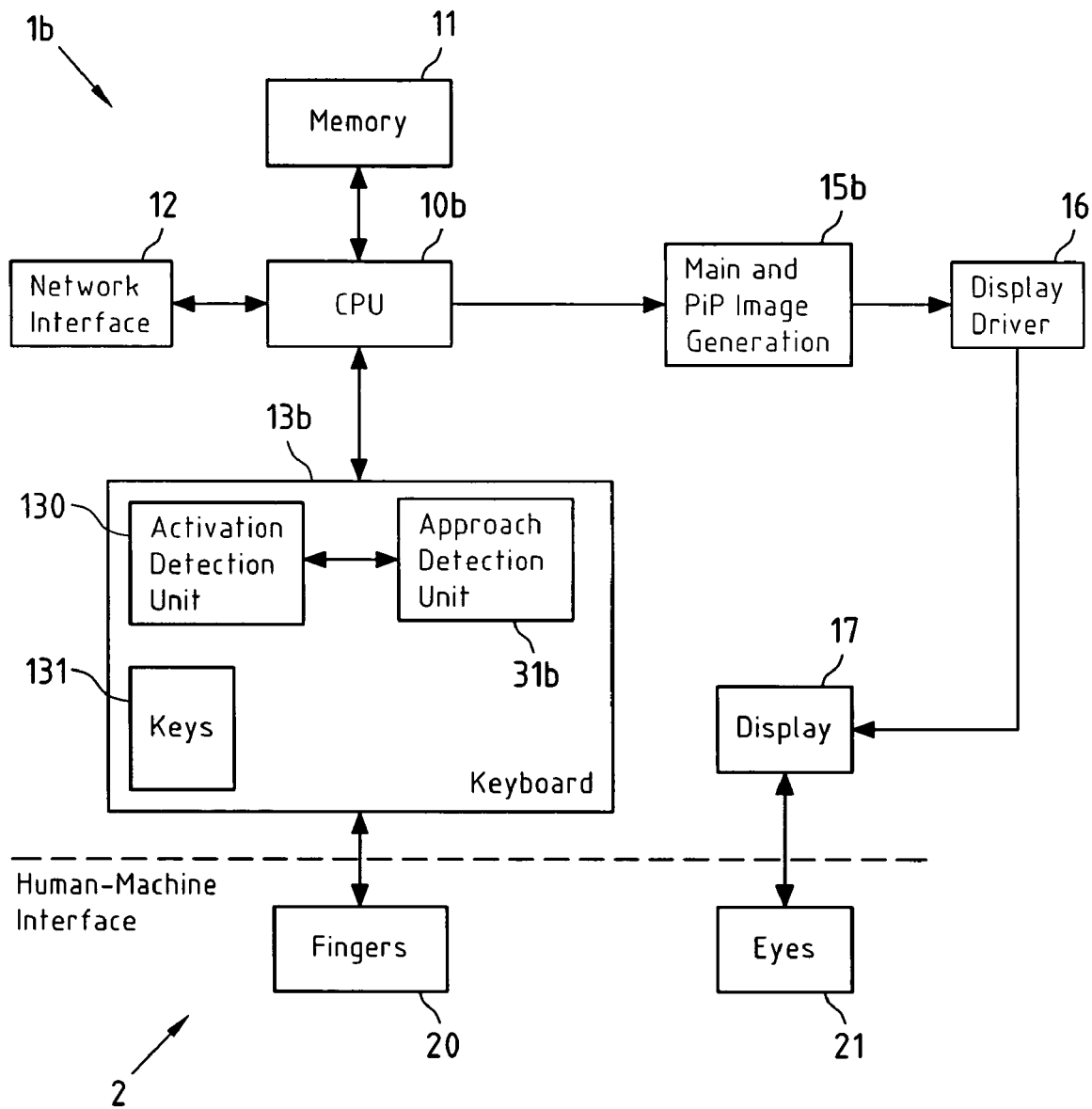
FIG. 3; a schematic presentation of a device with a keyboard as user interaction unit and means for detecting and displaying approached keys of said keyboard according to an embodiment of the present invention.

FIG. 3 depicts a device 1b according to an embodiment of the present invention, wherein the functionality to detect approached keys and to display representations thereof on the display 17 has been incorporated into said device 1b, which may allow for a more efficient implementation and more degrees of freedom in detecting approached keys and displaying representations thereof.

Again, like components are denoted with the same numerals as in FIG. 1.

The functionality proposed by the present invention affects the keyboard 13b, the CPU 10b and the main and PiP image generation instance 15b.

In particular, the approach detection unit 31b is now integrated into the keyboard 13b, and then may for instance co-operate with the activation detection unit 130. This may be particularly advantageous in the context of an optically projected virtual keyboard, where the activation detection unit 130 and the approach detection unit 31b can be implemented as one unit, i.e. the unit that performs the real-time tracking of the activation unit 20 by receiving and analysing the infrared signals reflected from the fingers 20 of the user 2.

If said keyboard 13 is a keyboard with keys that are activated by pressing, said approach detection unit may be integrated into each key, for instance as light barriers in each key, or temperature sensors, or electric contact sensors that sense the bearing of fingertips on the keys. As is readily seen, depending on the type of approach detection unit 31b, actual contact of the fingers 20 with the keys 131 is not necessarily required.

Information on approached and activated keys is then forwarded from said keyboard 13b to said CPU 10b. Based on said information, said CPU 10b triggers the main and PiP image generation instance 15b, so that both the main image is modified according to the activated keys and the PiP image is generated to show at least representations of said approached keys. For instance, if said main image is an image of a desktop with an open window related to an email composer, said CPU 10b triggers that alphanumeric symbols associated with each activated keys sequentially appear in said open window, so that an email can be written by said user 2 via said keyboard 13b. In parallel, in a PiP image overlaying said main image, representations of keys approached by the fingers 20 of user 2 are displayed to allow the user 2 to navigate his/her fingers 20 across the interaction unit 13b without requiring to frequently look at the keyboard 13b. Additionally, said CPU 10b may trigger said main and PiP image generation instance 15b so that representations of activated keys are also displayed in said PiP image, and so that also representations of at least a portion of all of said keys 131 of said keyboard 13b are displayed in said PiP image.

Figure 4:
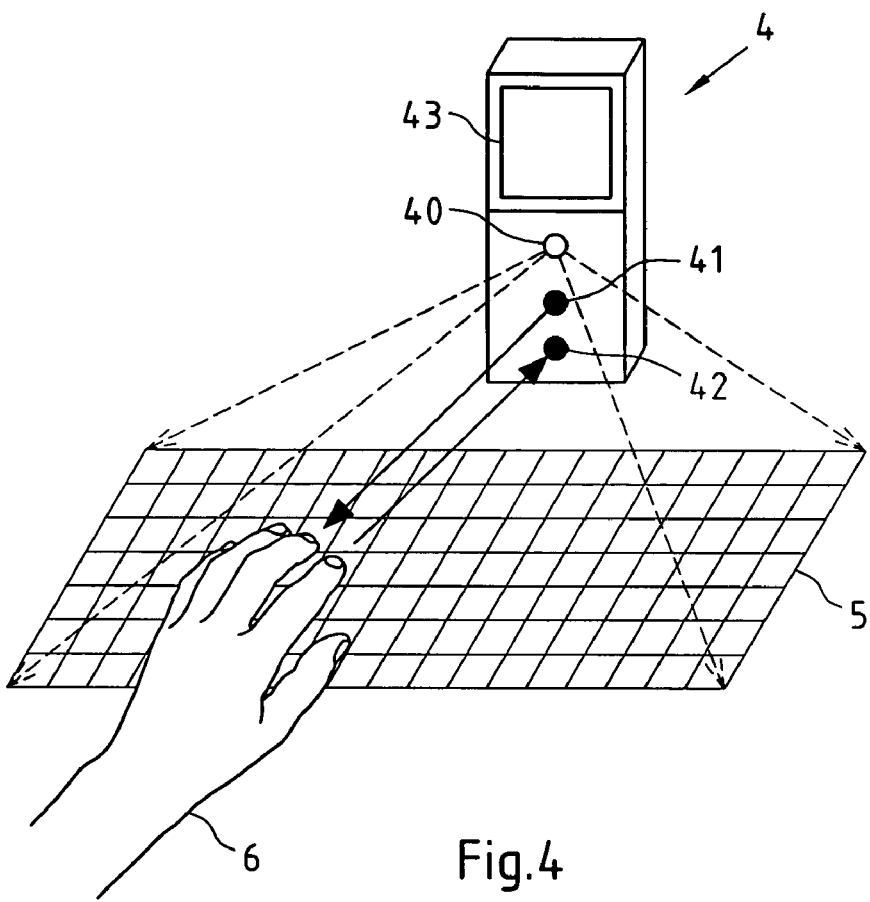
FIG. 4: a device comprising an optically projected virtual keyboard and means for detecting approached keys according to an embodiment of the present invention.

FIG. 4 depicts a device 4 comprising an optically projected virtual keyboard 5 and means 42 for detecting approached keys according to an embodiment of the present invention.

Therein, said device 4, for instance a mobile phone or a PDA, comprises a display 43 and a keyboard pattern projector 40, which optically projects a keyboard 5 that comprises a plurality of keys onto a surface. It is readily seen that, in this embodiment of the present invention, the keyboard 5 and the display 43 are not arranged on substantially opposite sides of said device 4, but on substantially the same side of said device 4. Therein, the layout of said keyboard may be standardized (like a QWERTZ or QWERTY keyboard), or customized. Each of said keys then is labelled with one or more alphanumeric symbols that are indicative of with which alphanumeric symbol or symbols said key is associated (not shown in FIG. 4). Said device 4 further comprises a light source 41, for instance an infrared laser diode, which emits a beam of infrared light towards the projected keyboard, and a sensor module 42, which provides for the detection of both the approached and activated keys. Said sensor module 42 may for instance locate the fingers of the user's hands 6 in 3-D space and track the intended "keystrokes".

Figure 5:
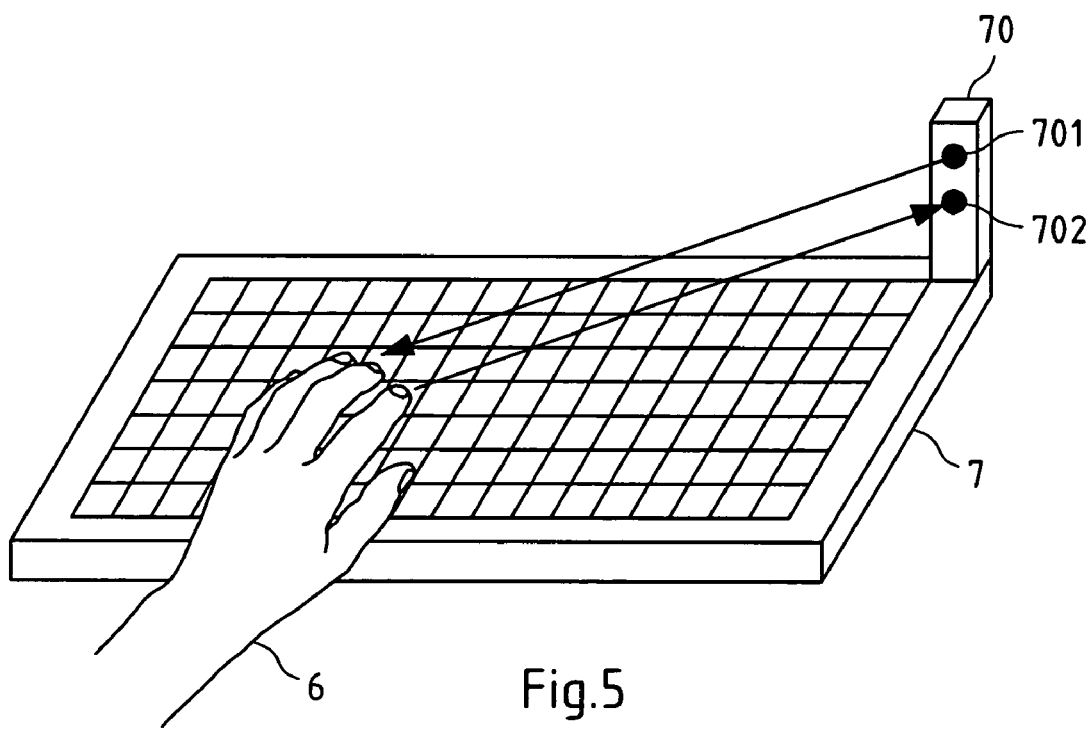
FIG. 5: a keyboard with means for detecting approached keys according to an embodiment of the present invention.

FIG. 5 depicts a keyboard 7 with means 70 for detecting approached keys according to an embodiment of the present invention. This type of means 70 for detecting approached keys may for instance be used in the module 3 of device 1a of FIG. 2 as approach detection unit 31.

As depicted in FIG. 5, said means 70 is mounted on the keyboard 7 and comprises a transmitter 701 and a receiver 702 for emitting optical, electro-magnetic or sound signals towards the hand 6 of a user that is typing on said keyboard 7, and for receiving reflections of said signals from said hand 6, respectively. From the received signals, a tracking of the movements of the fingers of said hand 6 is possible by applying appropriate signal processing to the receive signals. Therein, instead of a single transmitter 701 and receiver 702, also arrays of transmitters and receivers may be used to increase the spatial resolution of said means 70. Similarly, several of said means 70 may be mounted on different positions of said keyboard to increase the accuracy of said detection of said approached keys. It is readily seen that means 70 is especially suited for use as an add-on component to legacy keyboards.

Figure 6A:
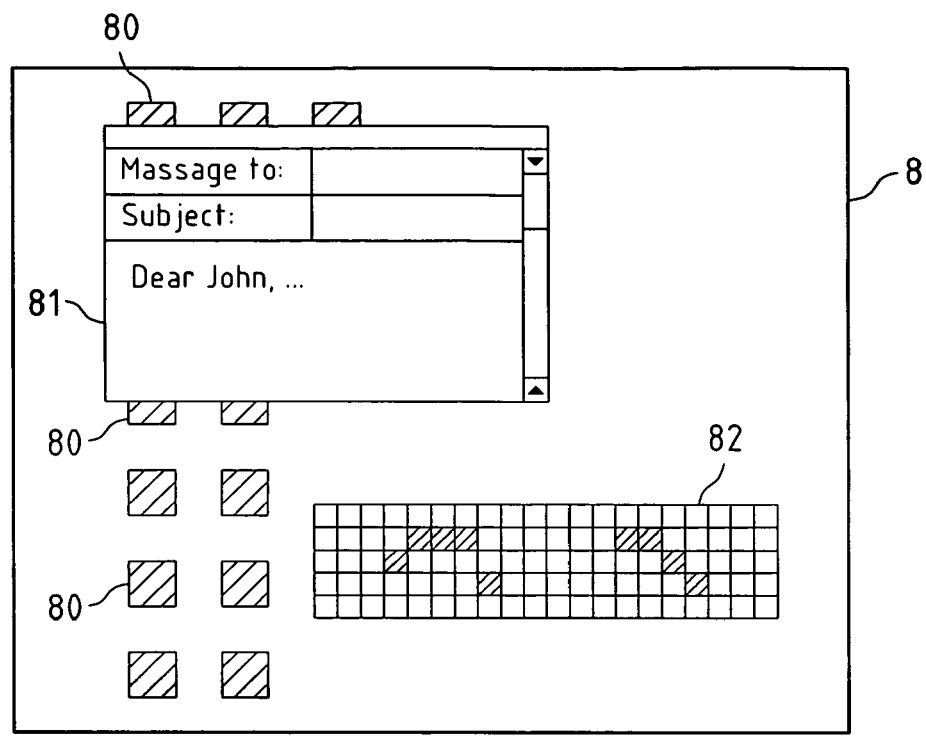
FIG. 6*a*: a representation of a keyboard and of its approached keys on a display according to an embodiment of the present invention.

FIG. 6a depicts the displaying of a representation of the keys of a keyboard and representations of its approached keys on a display 8 according to an embodiment of the present invention.

In said display 8, a main image, which consists of a plurality of desktop elements 80 and a window 81, is shown together with a PiP image 82.

Therein, said window 81 is a window associated with an email composer that allows a user to input text into said window. In the present example, a user has already written the phrase "Dear John,", and a cursor is indicating that the email composer is waiting for further text input, which can be accomplished by activating the keys of the keyboard.

In said PiP image 82, now a miniature image of said keyboard is displayed, wherein keys of said keyboard that have been detected as approached keys are displayed with a different background colour than the non-approached keys of the keyboard. Said keys of said keyboard may be labelled with the alphanumeric symbols they are associated with, which is not shown in FIG. 6a and FIG. 6b. When regarding the image of the keyboard in the PiP image 82, the user thus immediately knows where his/her finger tips are located on the actual keyboard without having to change his look direction from the display to the keyboard.

Figure 6B:
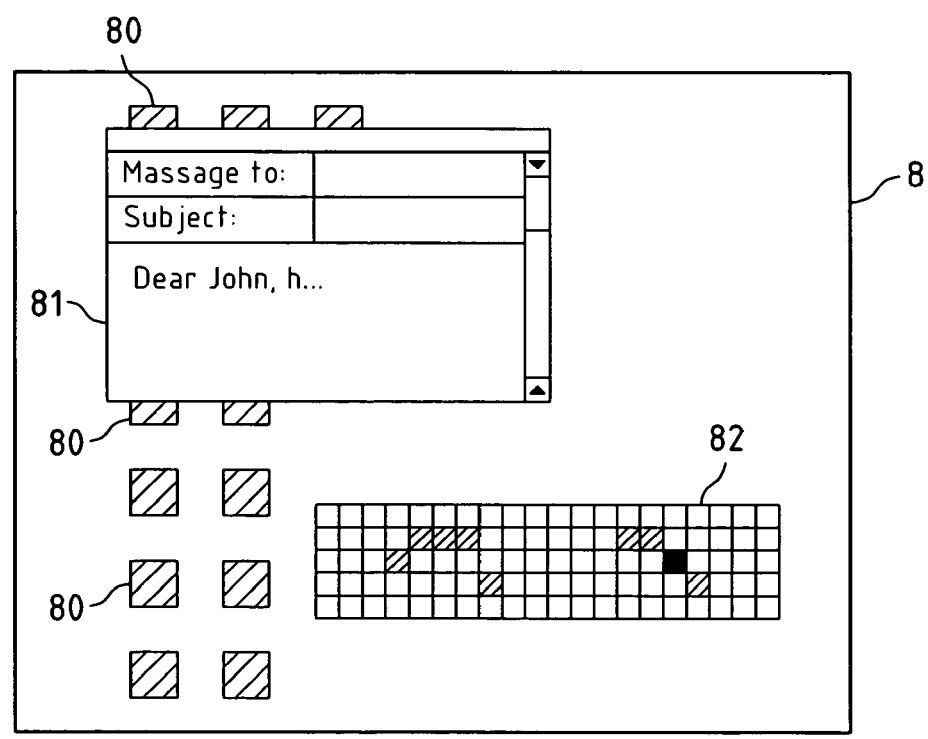
FIG. 6*b*: a representation of a keyboard and of its approached and activated keys on a display according to an embodiment of the present invention.

FIG. 6b depicts the same scenario as in FIG. 6a. However, the user now has activated the key "h", so that in the email composer window 81 of the main image on the display 8, now the phrase "Dear John, h" can be spotted. According to the present invention, now also a representation of this activated key "h" is displayed in the PiP image 82, wherein this representation of said activated key has darker background colour that differs from the background colour of said representations of said approached and non-approached keys.

In FIGS. 6a and 6b, it can be seen that the PiP image 82 has been positioned in the right lower corner of said main image so that only irrelevant parts of the main image are covered, in particular none of the desktop elements 80 of the main image are covered. This may for instance be achieved by allowing that a manufacturer or a user defines a position where said PiP image 82 is to be placed in the preferences of the devices or module, or by adaptively determining appropriate positions for said PiP image 82 in said display 8 where only small portions of relevant content or no relevant content at all is covered, for instance by analysing the main image signal.

Said PiP image 82 in FIGS. 6a and 6b can also be displayed in a semi-transparent fashion, so that the content of the main image that is overlaid by said PiP image 82 is still partly visible through the PiP image 82.

Figure 7A:
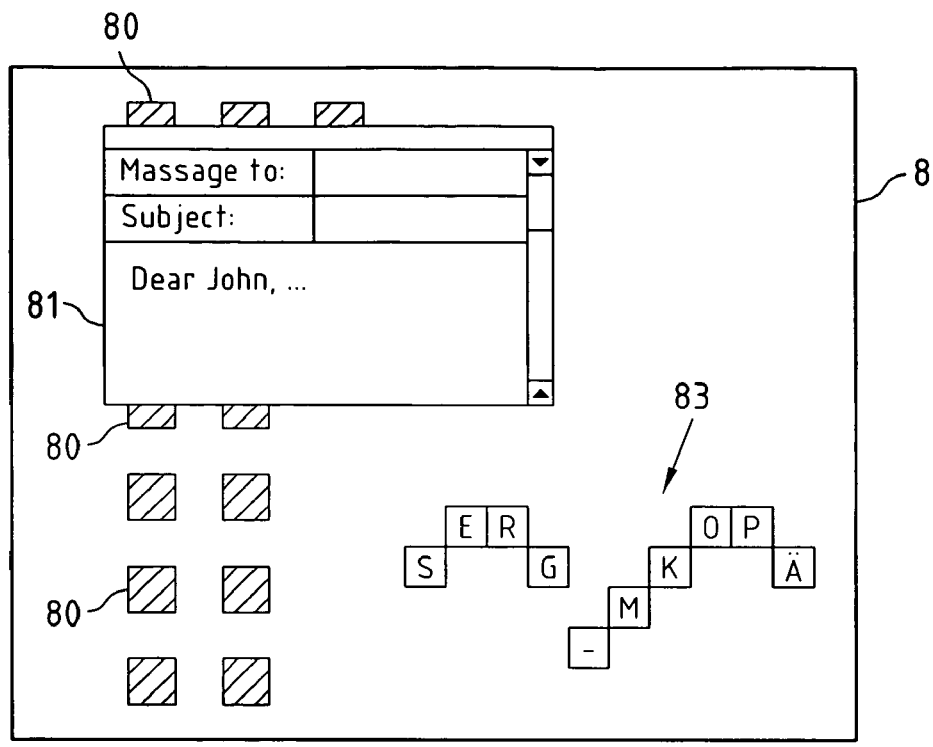
FIG. 7*a*: a representation of a keyboard and of its approached keys on a display according to an embodiment of the present invention.
Figure 7B:
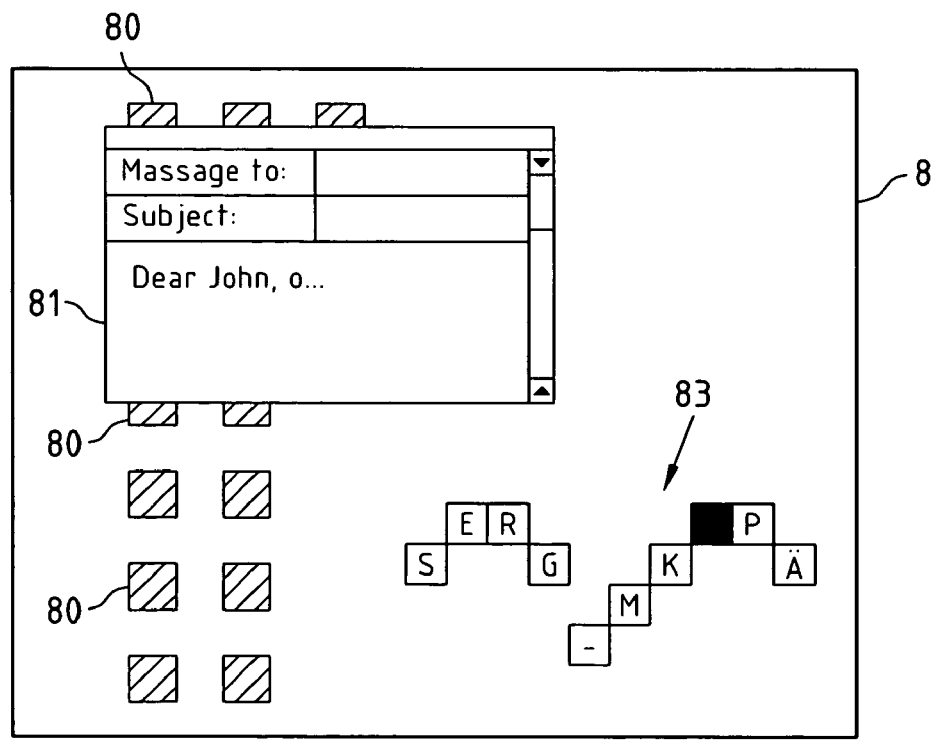
FIG. 7*b*: a representation of a keyboard and of its approached and activated keys on a display according to an embodiment of the present invention.

FIGS. 7a and 7b depict the displaying of representations of approached and active keys 83 on a display 8 according to an alternative embodiment of the present invention, wherein in FIGS. 7a and 7b, like elements are labelled with the same numerals as in FIGS. 6a and 6b.

As can be readily seen when comparing FIGS. 7a/7b with FIGS. 6a/6b, in the embodiment according to FIGS. 7a/7b, not the entire keyboard is represented in said PiP image 83, but only said approached keys (cf. FIG. 7a) and said activated keys (cf. the shaded key "o" in FIG. 7b). This contributes to causing less interference with the main image when displaying the PiP image 83, because less area of said main image is covered. FIG. 7a depicts the representation chosen for the approached keys, which are simply displayed as images of the respective keys labelled with the alphanumeric symbols they represent, and FIG. 7b depicts the representation chosen for the activated keys, which are similar to those of said approached keys, but with a different background colour (cf. activated key "o" in FIG. 7b).

It is readily understood that the position of the PiP image 83 can be similarly positioned as in the embodiment described with reference to FIGS. 6a and 6b.

Figure 8:
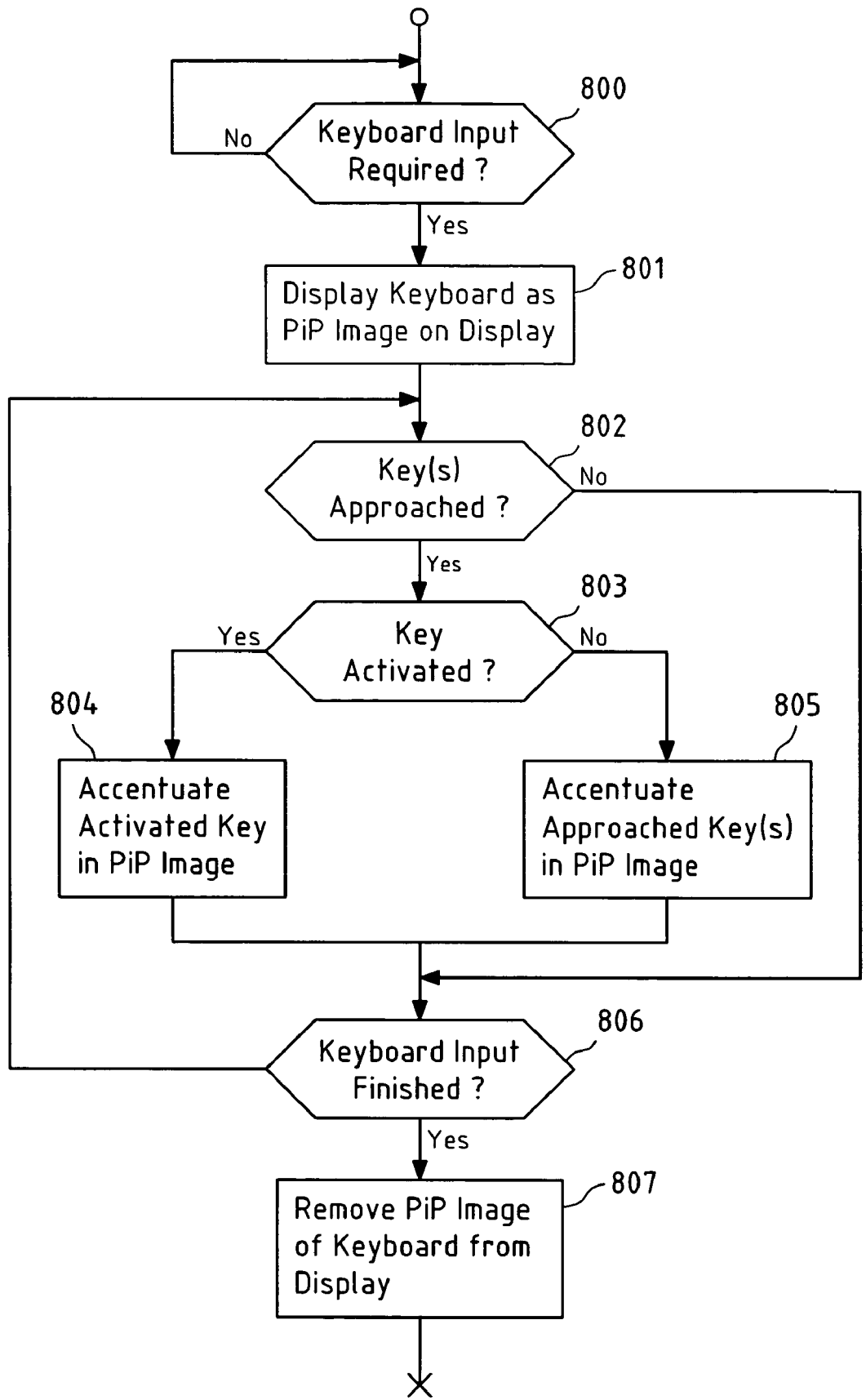
FIG. 8: a flowchart of a method for detecting approached and activated keys of a keyboard according to an embodiment of the present invention.

FIG. 8 presents a flowchart of a method for detecting approached and activated keys of a keyboard according to an embodiment of the present invention. The steps of this flowchart may for instance be performed by the module 3 of the device 1a in FIG. 2 or the keyboard 13b, the CPU 10b and the main and PiP image generation 15b in the device 1b of FIG. 3.

In a first step 800 of said method, it is checked if input from a keyboard is required by a device, for instance because an application that affords text input was started by a user of said device. If this is the case, a miniature image of the keyboard is then displayed on the display in a step 801, for instance in a way as depicted in FIG. 6a (without accentuated approached keys at this stage of the flowchart). It is also possible that this step is skipped, in particular if only the approached and the activated keys are to be shown as PiP image on the display, as depicted in FIGS. 7a and 7b.

In a step 802, it is then checked if one or more keys of said keyboard have already been approached by the fingers of the user, for instance by one of the techniques described with reference to FIGS. 4 and 5 above. If this is the case, it is checked in step 803 if one of said keys has been activated. If this is the case, a representation of said activated key is displayed in a PiP image on said display of said device (step 804), and if this is not the case, representations of the one or more approached keys are displayed in the PiP image on said display (step 805). Therein, said representations of said activated and approached keys may be displayed in said PiP image as exemplarily depicted in FIGS. 6b and 7b.

The method then checks in a step 806 if said keyboard input is finished, for instance by checking if some kind of interrupt was received that indicates that the application (e.g. an email composer or other text processing program) that required the text input was closed by the user. This step 806 is also performed if it is decided in step 802 that no keys are currently approached.

If keyboard input is not determined to be finished in step 806, the method jumps back to step 802 and, anew, detects approached and activated keys and displays representations thereof in said PiP image on said display.

If keyboard input is determined to be finished in step 806, the PiP image is removed from the display, and the method terminates.

The present invention has been described above by means of preferred embodiments. It should be noted that there are alternative ways and variations which are obvious to a skilled person in the art and can be implemented without deviating from the scope and spirit of the appended claims. In particular, the present invention is not limited to interaction units that are keyboards with QWERTY/QWERTZ or similar standardized keyboard patterns, it equally well applies to all types of customized keyboard patterns and in particular to small keypads of laptops and hand-held multimedia devices such as mobile phones or PDAs. Said interaction units may also be control pads of game consoles or other devices, wherein said control pads may only comprise navigation buttons, for instance arrow buttons, and some buttons linked to specific functions of said devices. It may also be the case that the interaction unit and the keyboard are arranged on opposite sites of the device to allow for better handling and reduced size of the device. The advantages in applying the present inventions in such scenarios is evident, as it may then be impossible for the user to insert text into said device in a reasonable manner. Instead of displaying said representations of said approached and activated interaction areas in the same display in which the main image (content) is shown, it may be advantageous to use two or more displays, wherein on one of said displays, the effects of said user interaction, i.e. the main image, are shown, and wherein on another display, representations of approached interaction areas and activated interaction areas are displayed. According to the present invention, it may then be advantageous that the at least two displays are positioned substantially close to each other so that only small changes in the look direction are required when toggling between the two displays.

What is claimed is:

1. A method comprising:
    causing projection of a virtual interaction unit comprising a plurality of interaction areas configured for activation by an activation unit onto a surface located adjacent to a device;
    detecting an approached interaction area of said virtual interaction unit, wherein said approached interaction area is one of said plurality of interaction areas that is approached by said activation unit without yet being activated;
    detecting an activated interaction area, wherein said activated interaction area is one of said plurality of interaction areas activated by said activation unit,
    causing display of a first representation of said approached interaction area in response to said activation unit approaching said approached interaction area on a display of said device in a first representation mode only when an interaction with said device is required, and causing display of a second representation of said activated interaction area in response to activation of said activated interaction area by said activation unit on said display in a second representation mode, wherein said second representation of said activated interaction area is displayed until said activation unit is removed from said activated interaction area,
    wherein said second representation is configured for display at the same location on said display as said first representation when said approached interaction area and said activated interaction area are the same interaction area of said plurality of interaction areas, and
    wherein of said plurality of interaction areas only representations of approached interaction areas and activated interaction areas are displayed in real-time on said display, and said representations of approached and activated interaction areas are simultaneously displayed on said display.

2. The method according to claim 1, wherein said first representation of said approached interaction area displayed on said display preserve information on the positioning of said plurality interaction areas on said interaction unit.

3. The method according to claim 1, wherein said first representation of said approached interaction area displayed on said display cover other content displayed on said display.

4. The method according to claim 1, wherein said first representation of said approached interaction area displayed on said display semi-transparently overlay other content displayed on said display.

5. The method according to claim 1, wherein said first representation of said approached interaction area are displayed on said display in a way that a minimum amount of interference with relevant parts of other content displayed on said display is caused.

6. The method according to claim 1, wherein said first representation of said approached interaction area and said second representation of said activated interaction area are only displayed on said display if at least one of said plurality interaction areas has been approached by said activation unit during a pre-defined period of time.

7. The method according to claim 1, wherein each of said plurality of interaction areas is associated with at least one interaction with said device, and wherein said associations can be re-configured.

8. The method according to claim 1, wherein said virtual interaction unit and said display are not positioned on substantially opposite sides of said device.

9. The method according to claim 1, wherein said virtual interaction unit is an optically projected keyboard, and wherein said plurality of interaction areas are keys of said keyboard.

10. The method according to claim 9, wherein approached keys of said keyboard are detected by optic and/or electromagnetic and/or sound waves.

11. The method according to claim 9, wherein said approached keys of said keyboard are detected by sensors that are contained in said keyboard, and wherein said sensors are thermal and/or electric and/or optic and/or electromagnetic and/or haptic sensors.

12. The method according to claim 1, wherein said virtual interaction unit is an optically projected virtual keyboard.

13. The method according to claim 1, wherein said virtual interaction unit is an optically projected virtual keyboard, and wherein detecting approached interaction areas and detecting activated interaction areas are performed by the same instance of said device.

14. The method according to claim 1, wherein said plurality of interaction areas of said virtual interaction unit are keys of a keyboard, wherein a schematic image of at least a portion of said keyboard is at least temporarily displayed on said display, and wherein approached keys of said keyboard are accentuated by changing an appearance of said approached keys in said schematic image.

15. The method according to claim 14, wherein said appearance of said approached keys in said schematic image is changed by changing a color and/or size and/or texture of said approached keys or by furnishing said approached keys with a frame or circle or a with spot light.

16. The method according to claim 1, wherein said device is capable of text processing.

17. The method according to claim 1, wherein said device is a portable device.

18. A non-transitory computer readable storage medium embedded with a computer program, comprising programming code for:
    causing projection of a virtual interaction unit comprising a plurality of interaction areas configured for activation by an activation unit onto a surface;

detecting an approached interaction area of said virtual interaction unit, wherein said approached interaction area is one of said plurality of interaction areas that is approached by said activation unit without yet being activated;
detecting an activated interaction area, wherein said activated interaction area is one of said plurality of interaction areas activated by said activation unit,
causing display of a first representation of said approached interaction area in response to said activation unit approaching said approached interaction area on a display of said device in a first representation mode only when an interaction with said device is required, and causing display of a second representation of said activated interaction area in response to activation of said activated interaction area by said activation unit on said display in a second representation mode, wherein said second representation of said activated interaction area is displayed until said activation unit is removed from said activated interaction area,
wherein said second representation is configured for display at the same location on said display as said first representation when said approached interaction area and said activated interaction area are the same interaction area of said plurality of interaction areas, and
wherein of said plurality of interaction areas only representations of approached interaction areas and activated interaction areas are displayed in real-time on said display, and said representations of approached and activated interaction areas are simultaneously displayed on said display.

19. An apparatus, comprising:
a projector configured to project a virtual interaction unit comprising a plurality of interaction areas onto a surface adjacent said apparatus, wherein said plurality of interaction areas can be activated by an activation unit to effect an interaction with said apparatus;
a detection unit for detecting an approached interaction area, wherein said approached interaction area is one of said plurality of interaction areas that is approached by said activation unit without yet being activated, and for detecting an activated interaction area, wherein said activated interaction area is one of said plurality of interaction areas that have been activated by said activation unit; and
a display for displaying a first representation of said approached interaction area in a first representation mode in response to said activation unit approaching said approached interaction area only when an interaction with said apparatus is required, and for displaying a second representation of said activated interaction area in a second representation mode in response to activation of said activated interaction areas by said activation unit, wherein said second representation of said activated interaction area is displayed until said activation unit is removed from said activated interaction area,
wherein said second representation is configured for display at the same location on said display as said first representation when said approached interaction area and said activated interaction area are the same interaction area of said plurality of interaction areas, and
wherein of said plurality of interaction areas only representations of approached interaction areas and activated interaction areas are displayed in real-time on said display, and said representations of approached and activated interaction areas are simultaneously displayed on said display.

20. An apparatus, comprising:
means for projecting a virtual interaction unit comprising a plurality of interaction areas that can be activated by an activation unit onto a surface adjacent to said apparatus;
means for detecting an approached interaction area, wherein said approached interaction area is one of said plurality of interaction areas that is approached by said activation unit without yet being activated and for detecting an activated interaction area, wherein said activated interaction area is one of said plurality of interaction areas that have been activated by said activation unit; and
means for displaying a first representation of said approached interaction area in a first representation mode in response to said activation unit approaching said approached interaction area only when an interaction with said apparatus is required, and for displaying a second representation of said activated interaction area in a second representation mode in response to activation of said activated interaction area by said activation unit, wherein said second representation of said activated interaction area is displayed until said activation unit is removed from said activated interaction area,
wherein said second representation is configured for display at the same location on said display as said first representation when said approached interaction area and said activated interaction area are the same interaction area of said plurality of interaction areas, and
wherein of said plurality of interaction areas only representations of approached interaction areas and activated interaction areas are displayed in real-time on said means for displaying, and said representations of approached and activated interaction areas are simultaneously displayed on said means for displaying.

21. An apparatus comprising:
a processor; and
a memory including computer program instructions, the memory and the computer program instructions being configured to, in cooperation with the processor, cause the apparatus to:
cause projection of a virtual interaction unit comprising a plurality of interaction areas configured for activation by an activation unit onto a surface located adjacent to the apparatus;
detect an approached interaction area of said virtual interaction unit, wherein said approached interaction area is one of said plurality of interaction areas that is approached by said activation unit without yet being activated;
detect an activated interaction area, wherein said activated interaction area is one of said plurality of interaction areas activated by said activation unit,
cause display of a first representation of said approached interaction area in response to said activation unit approaching said approached interaction area on a display of said apparatus in a first representation mode only when an interaction with said apparatus is required, and cause display of a second representation of said activated interaction area in response to activation of said activated interaction area by said activation unit on said display in a second representation mode, wherein said second representation of said activated interaction area is displayed until said activation unit is removed from said activated interaction area,
wherein said second representation is configured for display at the same location on said display as said first representation when said approached interaction area and said activated interaction area are the same interaction area of said plurality of interaction areas, and
wherein of said plurality of interaction areas only representations of approached interaction areas and activated interaction areas are displayed in real-time on said display, and said representations of approached and activated interaction areas are simultaneously displayed on said display.

* * * * *